(12) United States Patent
Lee et al.

(10) Patent No.: US 9,981,242 B2
(45) Date of Patent: May 29, 2018

(54) METHOD OF PREPARING ADSORBENT FOR PHOSPHORUS ADSORPTION AND ADSORBENT PREPARED BY THE SAME

(71) Applicants: Taeyoon Lee, Busan (KR); Junheok Lim, Busan (KR); Jeakeun Lee, Busan (KR); Jahyun Kim, Busan (KR)

(72) Inventors: Taeyoon Lee, Busan (KR); Junheok Lim, Busan (KR); Jeakeun Lee, Busan (KR); Jahyun Kim, Busan (KR)

( * ) Notice: Subject to any disclaimer, the term of this patent is extended or adjusted under 35 U.S.C. 154(b) by 371 days.

(21) Appl. No.: 14/444,976

(22) Filed: Jul. 28, 2014

(65) Prior Publication Data
US 2016/0023184 A1    Jan. 28, 2016

(51) Int. Cl.
*B01J 20/08* (2006.01)
*B01J 20/16* (2006.01)
*B01J 20/32* (2006.01)
*B01J 20/30* (2006.01)
*C02F 1/28* (2006.01)
*C02F 101/10* (2006.01)

(52) U.S. Cl.
CPC ............. *B01J 20/08* (2013.01); *B01J 20/165* (2013.01); *B01J 20/3071* (2013.01); *B01J 20/3078* (2013.01); *B01J 20/3204* (2013.01); *B01J 20/3225* (2013.01); *B01J 20/3236* (2013.01); *C02F 1/288* (2013.01); *C02F 2101/105* (2013.01)

(58) Field of Classification Search
CPC ...................................................... B01J 20/08
See application file for complete search history.

(56) References Cited

FOREIGN PATENT DOCUMENTS

CN    102503202 A  *  6/2012
CN    103664112 A  *  3/2014

* cited by examiner

*Primary Examiner* — Aileen B Felton
(74) *Attorney, Agent, or Firm* — John K. Park; Park Law Firm

(57) ABSTRACT

The present invention relates to a method for preparing an adsorbent for phosphorus adsorption and an adsorbent prepared by the method. More specifically, the present invention is based on the fact that phosphorus has a strong affinity for the surface of metal oxides or hydroxides, and relates to a method for preparing an adsorbent for phosphorus adsorption, which comprises absorbing and coating expanded vermiculite with aluminum and heating the coated vermiculite at high temperature to produce aluminum oxide on the surface of the expanded vermiculite so that the adsorption of phosphorus at the coordination of the oxide can be achieved with very high efficiency by a strong attraction between phosphorus ions and aluminum ions, and to an adsorbent prepared by the method.

3 Claims, 2 Drawing Sheets

METHOD OF PREPARING ADSORBENT FOR PHOSPHORUS ADSORPTION AND ADSORBENT PREPARED BY THE SAME

CROSS-REFERENCE TO RELATED APPLICATIONS

This application claims the benefit of Korean Patent Application No. 10-2014-0066402, filed on May 30, 2014 in the Korean Intellectual Property Office, which is incorporated herein by reference in its entirety.

BACKGROUND OF THE INVENTION

1. Field of the Invention

The present invention is based on the fact that phosphorus has a strong affinity for the surface of metal oxides or hydroxides, and relates to a method of preparing an adsorbent for phosphorus adsorption by absorbing and coating expanded vermiculite with aluminum and heating the coated vermiculite at high temperature to produce aluminum oxide on the surface of the expanded vermiculite so that the expanded vermiculite adsorbs phosphorus with high efficiency, and to an adsorption prepared by the method.

2. Description of Related Art

Generally, freshwater lakes, for example, eco-ponds or artificial lakes, in which water does not easily circulate and stagnates, microbial decomposition easily occurs. Particularly, surface layer water in freshwater lakes comes into active air with air, and thus the concentration of oxygen therein is high so that the propagation of plankton is active. However, when this propagation of plankton reaches a limit, the plankton dies and is deposited at the bottom of the water, and for this reason, organic matter in deep water is decomposed to produce nutrient salts such as phosphorus, which spoil the water.

In addition, nutrient salts such as phosphorus are introduced into ponds or lakes from the surroundings to cause eutrophication that causes the propagation of large amounts of green algae, a change in turbidity, offensive odors, and an increase in biochemical oxygen demand (BOD), thereby deteriorating the water quality.

In an attempt to solve the above-described problems, patent document 1 discloses a filter material for water purification, which is made of zeolite and functions to inhibit the occurrence of various foreign materials and adsorb the foreign materials.

Patent document 2 discloses a loess composition for water purification, which is based on loess and is disposed mainly in rivers and waterways for the purpose of naturally purifying running water.

Patent document 3 discloses a porous sintered aggregate for water purification, which is prepared by sintering loess so as to be able to be used as a filter material for water purification and may further contain charcoal so as to be used as a filter material for plant growth and development.

Patent document 4 discloses a water treatment agent based on natural minerals and plants, which is prepared by powdering minerals such as silicate, elvan, loess, kaolin and zeolite, dissolving the powdery materials in hot water to make a colloidal water solution containing natural mineral components and mixing the water solution with a water solution containing a natural sterilizer at a ratio of 1:1.

Particularly, as a technology of basically blocking or reducing the development of green algae by adsorbing and removing phosphorus among materials that cause the propagation of green algae in water, patent document 5 discloses a technology of forming charcoal powder consisting of, particularly, chaff, into charcoal balls capable of adsorbing phosphorus.

However, the above-described prior art technologies have a problem in that the efficiency of adsorption of phosphorus is very low. Thus, in recent years, there has been an attempt to coat expanded vermiculite with iron or glycerol in order to use the expanded vermiculite as an adsorbent for adsorbing phosphorus. However, in this case, the efficiency of adsorption of phosphorus also does not reach a satisfactory level.

PRIOR ART LITERATURE

Patent Documents

Patent Document 1: Korean Patent Laid-Open Publication No. 10-2005-0080053 entitled "Apparatus for Purifying Water"

Patent Document 2: Korean Patent Registration No. 10-0632249 entitled "Loess Composition for Water Purification and Block for Water Purification using the Same"

Patent Document 3: Korean Patent Registration No. 10-0567422 entitled "Method of Producing Porous Sintered Aggregate for Water Purification"

Patent Document 4: Korean Patent Registration No. 10-0623993 entitled "Method of Preparing Water Treatment Agent for Removing Green Algae and Moss"

Patent Document 5: Korean Patent Laid-Open Publication No. 10-2007-0026762 entitled "Water Purifying Charcoal Balls for Adsorbing Phosphorus In Water and Method of Producing The Same"

SUMMARY OF THE INVENTION

The present invention is based on the fact that phosphorus has a strong affinity for the surface of metal oxides or hydroxides, and it is an object of the present invention to a method for preparing an adsorbent for phosphorus adsorption, which comprises absorbing and coating expanded vermiculite with aluminum and heating the coated vermiculite at high temperature to produce aluminum oxide on the surface of the expanded vermiculite so that the adsorption of phosphorus at the coordination of the oxide can be achieved with very high efficiency by a strong attraction between phosphorus ions and aluminum ions, an adsorbent prepared by the method.

To achieve the above object, the present invention provides a method for preparing an adsorbent for phosphorus adsorption, the method comprising absorbing and coating expanded vermiculite with a solution of aluminum nitrate $(Al(NO_3)_3 \cdot 9H_2O)$ and heating the coated vermiculite.

The present invention also provides an adsorbent for phosphorus adsorption, which is prepared by the above method that comprises absorbing and coating expanded vermiculite with a solution of aluminum nitrate and heating the coated solution to produce aluminum oxide on the surface of the expanded vermiculite. Specifically, the method for preparing the adsorbent for phosphorus adsorption may preferably include the steps of:

(S100) adding sodium hydroxide (NaOH) to an aluminum nitrate solution to adjust the pH of the solution;

(S200) adding expanded vermiculite to the aluminum nitrate solution whose pH has been adjusted in step S100;

(S300) primarily heating the expanded vermiculite on which has been absorbed and coated with the aluminum nitrate solution in S200; and (S400) washing the expanded vermiculite primarily heated in step S300, and secondarily heating the washed vermiculite, followed by cooling.

Step S100 of the method may preferably be performed by adding sodium hydroxide to adjust the pH of the aluminum nitrate solution to 12.0±0.5.

Step S200 may preferably be performed by adding 40-60 g of the expanded vermiculite per 100 mL of the aluminum nitrate solution whose pH has been adjusted in step S100.

Step S300 may preferably be performed by primarily heating the expanded vermiculite, which has been absorbed and coated with the aluminum nitrate solution in step S200, at 60-80° C. for 22-26 hours while stirring the expanded vermiculite at intervals of 25-35 minutes for the first 3-5 hours.

Step S400 may preferably be performed by washing the expanded vermiculite, which has been primarily heated in step S300, with distilled water to reach a pH of 6-8, and secondarily heating the washed vermiculite at 450-550° C. for 50-70 minutes, followed by cooling to 15-25° C.

According to the present invention, aluminum is absorbed into and coated onto expanded vermiculite and heated at high temperature to produce aluminum oxide on the surface of the expanded vermiculite so that the adsorption of phosphorus at the coordination of the oxide can be achieved with very high efficiency by a strong attraction between phosphorus ions and aluminum ions.

BRIEF DESCRIPTION OF THE DRAWINGS

The above and other objects, features and advantages of the present invention will be apparent from the following detailed description of the preferred embodiments of the invention when taken in conjunction with the accompanying drawings, in which.

EXPLANATION ON SYMBOLS

S100: Adjust pH of aluminum nitrate solution
S200: Add expanded vermiculite
S300: Primarily heat vermiculite
S400: Secondarily heat and cool vermiculite

DETAILED DESCRIPTION OF THE PREFERRED EMBODIMENTS

The present invention for achieving the above-mentioned effects is directed to a method for preparing an adsorbent for phosphorus adsorption and an adsorbent prepared by the same. It is to be noted that only portions necessary for understanding the technical constitution of the present invention will be described and the description of the remaining portions will be omitted to avoid obscuring the subject matter of the present invention.

Hereinafter, the method for preparing the adsorbent for phosphorus adsorption according to the present invention will be described in detail.

Figure 1:
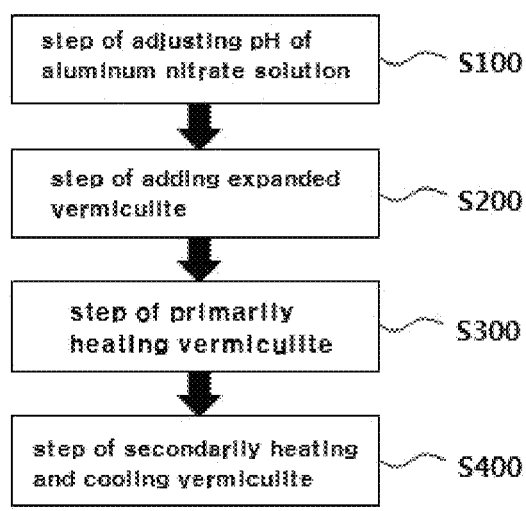
FIG. 1 is a flowchart showing a method for preparing an adsorbent for phosphorus adsorption according to the present invention.

As shown in FIG. 1, the method for preparing the adsorbent for phosphorus adsorption according to the present invention comprises the steps of: (S100) of adjusting the pH of an aluminum nitrate solution; (S200) of adding expanded vermiculite; (S300) of primarily heating the expanded vermiculite; and (S400) of secondarily heating and cooling the expanded vermiculite.

Step (S100) of adjusting the pH of the aluminum nitrate solution is a step of adding sodium hydroxide (NaOH) to the solution of aluminum nitrate ($Al(NO_3)_3 \cdot 9H_2O$) to adjust the pH of the solution. Specifically, sodium hydroxide is added so that the pH of the aluminum nitrate solution reaches 12.0±0.5.

If the pH of the solution is out of the above-specified range, the aluminum nitrate solution cannot be sufficiently absorbed into and coated onto expanded vermiculite which will be added later.

Step (S200) of adding expanded vermiculite is a step of adding expanded vermiculite to the aluminum nitrate solution, the pH of which has been adjusted in step S100, to absorb and coat the expanded vermiculite with the aluminum nitrate solution. Specifically, 40-60 g of expanded vermiculite is added per 100 mL of the aluminum nitrate solution.

If the amount of expanded vermiculite added is less than 40 g per 100 of the aluminum nitrate solution, the workability of subsequent processes can be reduced by a considerable amount of aluminum nitrate solution that was not absorbed into and coated onto the expanded vermiculite, and if it is more than g per 100 mL of the aluminum nitrate solution, the aluminum nitrate solution cannot be sufficiently absorbed into and coated onto expanded vermiculite, and thus aluminum oxide cannot be sufficiently produced during heating.

As used herein, the term "expanded vermiculite" refers to vermiculite obtained by expanding conventional vermiculite by heat. Because expanded vermiculite is an already known material that is widely used as a heat insulating material or the like, the detailed description thereof is omitted, and various types of known expanded vermiculite may be used in the present invention.

Step S300 of heating primarily heating the expanded vermiculite is a step of primarily heating the expanded vermiculite, which has been absorbed and coated with the aluminum nitrate solution in step S200. Specifically, the expanded vermiculite is primarily heated in an electric furnace at 60-80° C. for 22-26 hours while the expanded vermiculite is stirred at intervals of 25-35 minutes for the first 3-5 hours.

If the heating conditions are out of the above-specified ranges, aluminum oxide will not be sufficiently produced.

Step (S400) of secondarily heating the expanded vermiculite is a step of washing the expanded vermiculite, which has been primarily heated in step S300, and secondarily heating the washed vermiculite, followed by cooling. Specifically, the expanded vermiculite primarily heated in step S300 is washed with distilled water to reach a pH of 6-8 and is secondarily heated in an electric furnace at 450-550° C. for 50-70 minutes, followed by cooling to 15-25° C. If the washing, heating and cooling conditions are out of the above-specified ranges, aluminum oxide will not be sufficiently produced or the storage stability thereof will be reduced.

Hereinafter, the adsorbent for phosphorus adsorption according to the present invention will be described in detail.

As described above, according to the present invention, the adsorbent is prepared by absorbing and coating expanded vermiculite with an aluminum nitrate solution and heating the coated vermiculite at high temperature to produce aluminum oxide on the surface of the expanded vermiculite.

Specifically, the aluminum nitrate solution, absorbed into and coated onto expanded vermiculite, is converted to aluminum oxide as shown in the following reaction formula 1:

$$Al(NO_3).9H2O + O_2 \rightarrow Al_2O_3 \qquad \text{Reaction formula 1}$$

Specifically, in view of the fact that phosphorus has a strong affinity for the surface of metal oxides or hydroxides, aluminum is absorbed into and coated onto expanded vermiculite and heated at high temperature to produce aluminum oxide on the surface of the expanded vermiculite, so that the adsorption of phosphorus at the coordination of the oxide is achieved with very high efficiency by a strong attraction between phosphorus ions and aluminum ions.

More specifically speaking, it is known that phosphorus has a strong affinity for metal surfaces, and thus phosphorus is strongly adsorbed onto the surface of metal oxides or hydroxides. In other words, the affinity of adsorption of phosphorus onto the surface of the oxides as described above is generally related to the amount of an anionic complex that is bonded to a group on the surface by a ligand exchange reaction, and the affinity is related to the electrostatic interaction of this attraction. When aluminum oxide is produced as described, the adsorption of phosphorus at the coordination of the oxide can be achieved by an attraction between phosphorus ions and aluminum ions.

Hereinafter, the present invention will be described in further detail with reference to examples, but the scope of the present invention is not limited by these examples.

1. Preparation of Adsorbent for Phosphorus Adsorption

Example 1

187.565 g of Al(NO$_3$)$_3$.9H2O was placed in a 1-liter round-bottom flask to prepare a 0.5 M solution of Al(NO$_3$).9H2O. NaOH was added to 200 mL of the solution with stirring so that the pH of the solution reached 12.0±0.5 as measured by a pH meter. Next, 80 g of vermiculite was added to the solution, and the solution was allowed to be sufficiently absorbed into the vermiculite, followed by heating in an electric furnace at 60° C. for 26 hours. At this time, the vermiculite was stirred at intervals of 35 minutes for the first 5 hours. After 26 hours, the vermiculite taken out of the dryer was washed with distilled water to reach a pH of 6 and heated in an electric furnace at 450° C. for 50 minutes. Next, the vermiculite in the electric furnace was cooled to room temperature, thereby preparing an adsorbent.

Example 2

187.565 g of Al(NO$_3$)$_3$.9H2O was placed in a 1-liter round-bottom flask to prepare a 0.5 M solution of Al(NO$_3$).9H2O. NaOH was added to 200 mL of the solution with stirring so that the pH of the solution reached 12.0±0.5 as measured by a pH meter. Next, 120 g of vermiculite was added to the solution, and the solution was allowed to be sufficiently absorbed into the vermiculite, followed by heating in an electric furnace at 80° C. for 22 hours. At this time, the vermiculite was stirred at intervals of 25 minutes for the first 3 hours. After 22 hours, the vermiculite taken out of the dryer was washed with distilled water to reach a pH of 8 and heated in an electric furnace at 550° C. for 70 minutes. Next, the vermiculite in the electric furnace was cooled to room temperature, thereby preparing an adsorbent.

Comparative Example 1

NaOH was added to 200 mL of 0.5M Fel(NO$_3$).9H2O with stirring to adjust the pH to 11.5±0.5. 100 g of vermiculite was added to the solution, and then heated with stirring in an electric furnace at 110° C. for 48 hours. After 48 hours, the vermiculite taken out of the dryer was washed with distilled water to reach a pH of 7 and heated in an electric furnace at 500° C. for 1 hour. Next, the vermiculite in the electric furnace was cooled to room temperature, thereby preparing an adsorbent.

Comparative Example 2

400 mL of glycerol and 100 mL of 4M sulfuric acid were placed in a 500 mL beaker, and then the solution was strongly stirred with 20 g of vermiculite. The mixed vermiculite was placed in a crucible in such a manner that it did not exceed ½ of the crucible, after which it was heated at 750° C. for 1 hour and then cooled to room temperature, thereby preparing an adsorbent.

Comparative Example 3

Uncoated expanded vermiculite was used without any treatment.

2. Experimental Method

A. Analysis of the Surface and Element Content of the Absorbents of Examples 1 and 2

Figure 2:
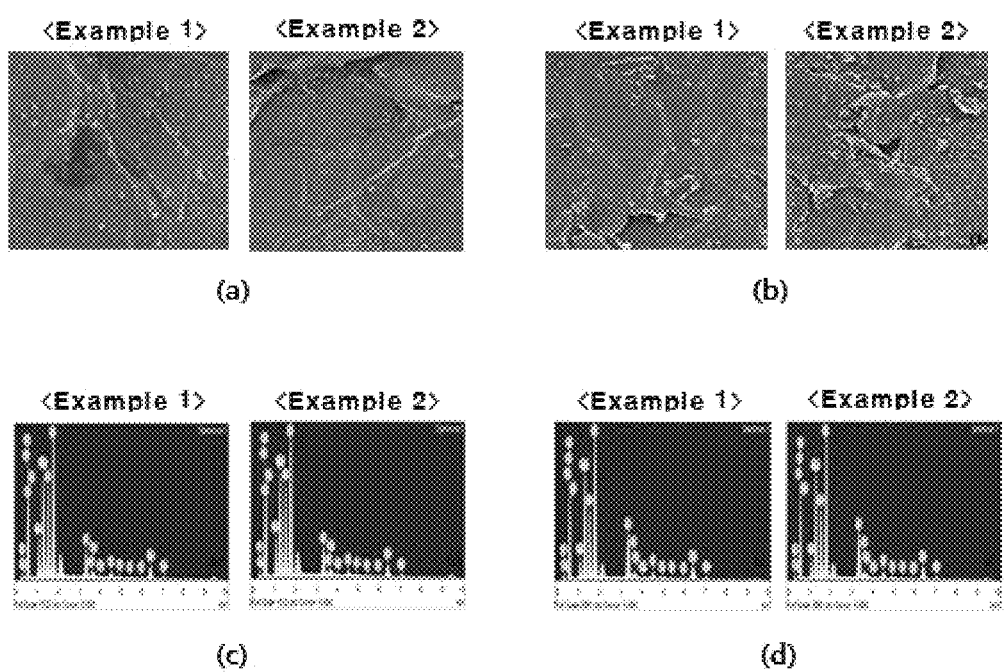
FIG. 2 is a set of SEM images (20,000× magnification) showing the surface states of an adsorbent of the present invention before and after adsorption of phosphorus and is a set of graphs showing the contents of elements in the absorbent before and after adsorption of phosphorus.

The surface and element content of the aluminum-coated expanded vermiculites prepared in Examples 1 and 2 were analyzed using a SEM (S-2700, HITACHI, Japan) equipped with EDS (Energy Dispersive X-Ray Spectrometer, HORIBA, Japan), and the results of the analysis are shown in FIG. 2.

As can be seen in FIG. 2(a), the surface of the expanded vermiculite coated with aluminum was uniform and coated smoothly with Al(NO$_3$). FIG. 2(b) shows the surface of the aluminum-coated vermiculite after adsorption of phosphorus (batch test), and as can be seen therein, the fine pores were filled with phosphorus ions during adsorption. Specifically, the results of the SEM analysis indicate that the adsorption of phosphorus onto the aluminum-coated vermiculite mostly occurs on the surface. FIGS. 2(c) and 2(d) are graphic diagrams showing the results of the EDS analysis after before and after adsorption of phosphorus, and as can be seen therein, the contents of almost all the elements were similar, and the contents of Al, Na and K slightly decreased after adsorption of phosphorus.

B. Adsorption Patterns of the Adsorbents of Examples and Comparative Examples 2 g of each of the adsorbents prepared in Examples 1 and 2 and Comparative Examples 1 to 3 was fixed to an about 50-mL Teflon container, and 40 mL of a standard solution containing mg/L of phosphate (KH$_2$PO$_4$) was added thereto and then stirred for 24 hours while a specific amount of a sample was collected at predetermined time points. The collected sample was filtered through a 0.45 μm filter, and then the concentration of phosphorus therein was measured. The results of the measurement are shown in FIG. 3.

Figure 3:
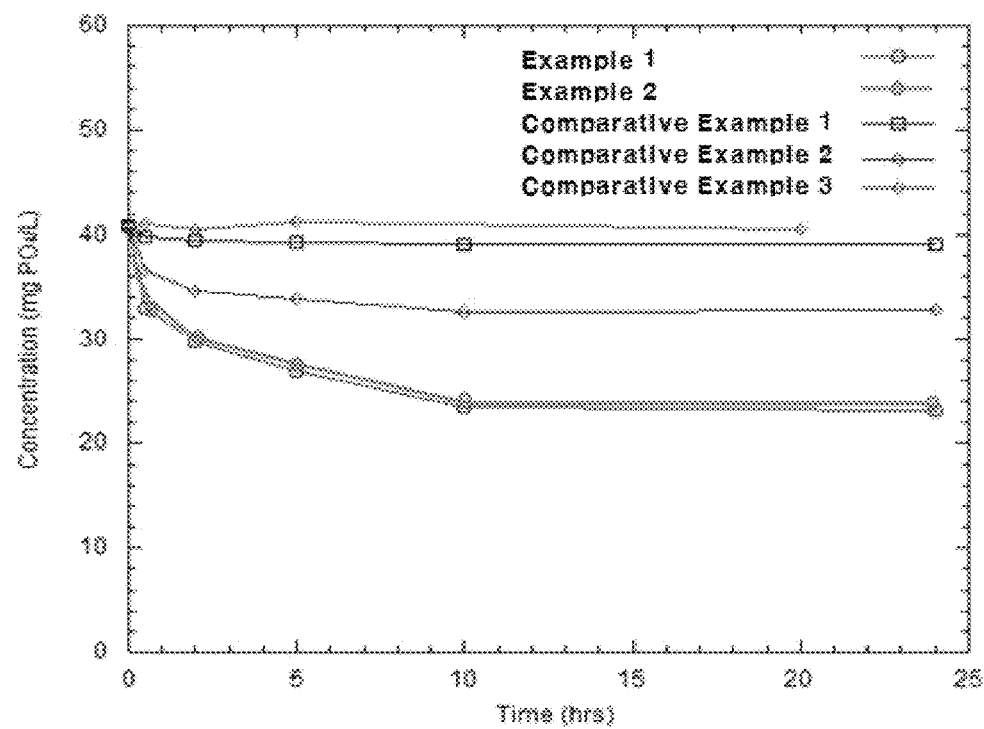
FIG. 3 is a set of graphs showing the phosphorus adsorption patterns of the examples of the present invention and comparative examples.

As can be seen in FIG. 3, the expanded vermiculite of Comparative Example 3 adsorbed little or no phosphorus for 24 hours, and the concentrations of phosphorus measured after 24 hours were 23.1, 23.2, 39.0 and 32.8 mg/L in Examples 1 and 2 and Comparative Examples 1 and 2, respectively, suggesting that the adsorbents of Examples 1 and 2 more easily adsorbed phosphorus compared to the adsorbents of Comparative Examples 1 and 2 and adsorbed almost all phosphorus within 10 hours.

While the preferred embodiments of a method for preparing an adsorbent for phosphorus adsorption and an adsorbent prepared by the same according to the present invention has been shown and described with reference to the accompanying drawings and excellence of the adsorbent of the present invention has been confirmed, they are merely illustrative embodiments, and the invention is not limited to these embodiments. It is to be understood by a person having an ordinary skill in the art that various equivalent modifications and variations of the embodiments can be made without departing from the spirit and scope of the present invention. Therefore, various embodiments of the present invention are merely for reference in defining the scope of the invention, and the true technical scope of the present invention should be defined by the technical spirit of the appended claims.

LEGEND

S100: step of adjusting pH of aluminum nitrate solution
S200: step of adding expanded vermiculite
S300: step of primarily heating vermiculite
S400: step of secondarily heating and cooling vermiculite

What is claimed is:

1. A method for preparing an adsorbent for phosphorus adsorption, the method comprising absorbing and coating expanded vermiculite with a solution of aluminum nitrate ($Al(NO_3)_3 \cdot 9H_2O$) and heating the coated vermiculite, and further comprising steps of:
    (S100) adding sodium hydroxide (NaOH) to an aluminum nitrate solution to adjust the pH of the solution;
    (S200) adding expanded vermiculite to the aluminum nitrate solution whose pH has been adjusted in step S100;
    (S300) primarily heating the expanded vermiculite on which has been absorbed and coated with the aluminum nitrate solution in S200; and
    (S400) washing the expanded vermiculite primarily heated in step S300, and secondarily heating the washed vermiculite, followed by cooling,
    wherein step S100 is performed by adding sodium hydroxide to adjust the pH of the aluminum nitrate solution to 12.0±0.5,
    wherein step S400 is performed by washing the expanded vermiculite, which has been primarily heated in step S300, with distilled water to reach a pH of 6-8, and secondarily heating the washed vermiculite at 450-550° C. for 50-70 minutes, followed by cooling to 15-25° C.

2. The method according to claim 1, wherein step S200 is performed by adding 40-60 g of the expanded vermiculite per 100 mL of the aluminum nitrate solution whose pH has been adjusted in step S100.

3. The method according to claim 1, wherein step S300 is performed by primarily heating the expanded vermiculite, which has been absorbed and coated with the aluminum nitrate solution in step S200, at 60-80° C. for 22-26 hours while stirring the expanded vermiculite at intervals of 25-35 minutes for the first 3-5 hours.

* * * * *